United States Patent [19]

Kim et al.

[11] Patent Number: 4,698,481

[45] Date of Patent: Oct. 6, 1987

[54] METHOD FOR PREVENTING DECOMPOSITION OF SILICON CARBIDE ARTICLES DURING HIGH TEMPERATURE PLASMA FURNACE SINTERING

[75] Inventors: Jonathan J. Kim, Williamsville; Joel D. Katz, Youngstown, both of N.Y.

[73] Assignee: Kennecott Corporation, Cleveland, Ohio

[21] Appl. No.: 843,788

[22] Filed: Mar. 25, 1986

Related U.S. Application Data

[63] Continuation-in-part of Ser. No. 718,374, Apr. 1, 1985.

[51] Int. Cl.$^4$ ............................................. B23K 15/00
[52] U.S. Cl. ........................ 219/121 PY; 219/121 PE; 219/121 P; 432/13; 419/56; 419/45
[58] Field of Search ................ 501/88, 90; 219/121 P, 219/121 PY, 121 PE, 121 PD; 419/56–58, 45; 432/13

[56] References Cited

U.S. PATENT DOCUMENTS

| Re. 30,286 | 5/1980 | Coppola et al. ................... 106/44 |
|---|---|---|
| 3,432,296 | 3/1969 | McKinnon et al. ............ 219/121 PY |
| 3,977,837 | 8/1976 | Mal et al. ........................... 75/204 |
| 4,141,726 | 2/1979 | Yajima et al. ..................... 428/567 |
| 4,179,299 | 12/1979 | Coppola et al. ................... 106/44 |
| 4,381,931 | 5/1983 | Hunold et al. ....................... 419/2 |
| 4,446,100 | 5/1984 | Adlerborn et al. ................ 419/56 |
| 4,501,717 | 2/1985 | Tsukamoto et al. ............... 419/58 |
| 4,562,040 | 12/1985 | Yamada et al. .................... 419/57 |

FOREIGN PATENT DOCUMENTS

0032100 12/1980 European Pat. Off. .
2510986 8/1982 France .

OTHER PUBLICATIONS

"Test Furnace Achieves 2200° C. (4000° F.) in Air, Inert Atmospheres", Presented by Harper Electric Furnace Corp., *Harper Highlights*, vol. 5, No. 1, Spring 85.

*Primary Examiner*—M. H. Paschall
*Attorney, Agent, or Firm*—Pahl, Lorusso & Loud

[57] ABSTRACT

A system to prevent, retard or reverse the decomposition of silicon carbide articles during high temperature plasma sintering. Preferably, the system comprises sintering a silicon carbide refractory or ceramic green body in a closed sintering environment, such as a closed tube, with strategic placement of the plasma torch or torches, exhaust outlet and tube. As sintering proceeds, a silicon vapor pressure builds up within the tube, retarding the decomposition of the silicon carbide body. The plasma torch, exhaust outlet, and tubes are positioned so that buoyant convective flow is maximized to increase the heat transfer and energy efficiency. In another embodiment, a "sacrificial" source of silicon carbide is placed into the sintering furnace. The silicon carbide in the sacrificial source starts to decompose before the silicon carbide refractory or ceramic article, creating a supersaturated atmosphere of silicon vapor species in the furnace. This prevents, retards or reverses the silicon carbide decomposition reactions and thus maintains the integrity of the refractory or ceramic article being sintered. Preferably, the sacrificial source is placed in a closed sintering environment along with the silicon carbide articles being sintered.

17 Claims, 1 Drawing Figure

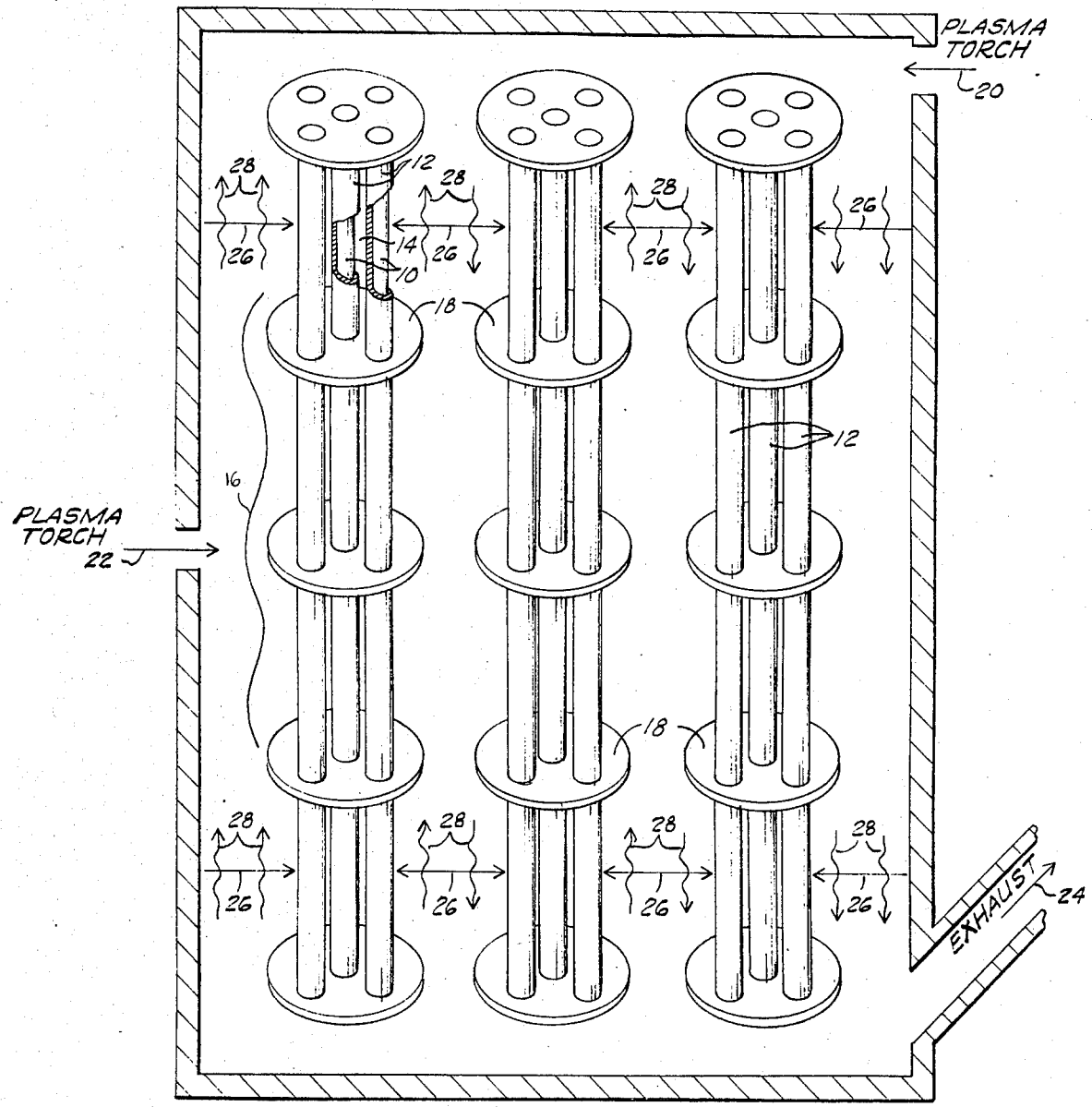

4,698,481

METHOD FOR PREVENTING DECOMPOSITION OF SILICON CARBIDE ARTICLES DURING HIGH TEMPERATURE PLASMA FURNACE SINTERING

CROSS REFERENCE TO RELATED APPLICATIONS

This application is a continuation-in-part of copending patent application Ser. No. 718,374, entitled "System for Preventing Decomposition of Silicon Carbide Articles During Sintering", which was filed on Apr. 1, 1985 and the teachings of which are incorporated herein by reference.

BACKGROUND OF THE INVENTION

This invention relates to a system for preventing, retarding or reversing the decomposition of silicon carbide refractory or ceramic articles during high temperature sintering.

Silicon carbide has several physical and chemical properties which make it an excellent material for high temperature, structural uses. Mechanically, silicon carbide is a hard, rigid, brittle solid which does not yield to applied stresses even at temperatures approaching its decomposition temperature. Because of its high thermal conductivity, silicon carbide is an excellent material for heat exchangers, muffle type furnaces, crucibles, gas-turbine engines and retorts in the carbothermic production and distillation of zinc. Silicon carbide is also used in electrical resistance elements, ceramic tiles, boilers, around tapping holes, in heat treating, annealing and forging furnaces, in gas producers, and in other places where strength at high temperatures, shock resistance and slag resistance are required. Properties associated with silicon carbide refractory and ceramic materials include superior strength, high elastic modulus, high fracture toughness, corrosion resistance, abrasion resistance, thermal shock resistance, and low specific gravity.

Silicon carbide refractory or ceramic materials are generally sintered at temperatures above 1900° C. so that the silicon carbide articles will develop desirable physical and chemical properties such as high strength, high density and low chemical reactivity. A reducing or inert atmosphere is generally used for sintering silicon carbide to provide formation of compounds which may have undesirable physical or chemical properties. Electric kilns are typically used to sinter silicon carbide ceramic or refractory materials under controlled atmospheres, but these tend to be energy inefficient and slow. In the case of a kiln equipped with graphite heating elements, the voltage can be controlled and the kiln can be heated to fairly high temperatures, yet there are several disadvantages: (1) the heating elements have a limited size, complex shape and must be kept under a strictly controlled atmosphere to maintain a long life; and (2) it is difficult to achieve a uniform temperature in this type of kiln because the heating elements provide only radiant heat. Because of radiant heat transfer, as well as a size limit for heating elements, the kiln has a poor load density, limited productivity, and a poor energy efficiency.

Plasma arc technology has recently been applied to the production of refractory and ceramic materials to reduce the furnace energy requirements and retention times. However, plasma technology has generally only been used for the fusion of high temperature materials and not for sintering or reaction sintering. This is because the required sintering temperature for most ceramic or refractory materials is usually less than 2500° C., whereas the average temperature of gases heated through a plasma arc column is above about 4000° C. For instance, alpha silicon carbide is generally sintered at temperatures of between 1900° C. to 2350° C. At temperatures above around 2150° C., silicon carbide decomposes into silicon gas and solid carbon. The carbon may then react further with the silicon carbide and silicon gas to form other vapor species, such as $SiC_2$ and $Si_2C$. This decomposition of silicon carbide could result in substantial shrinkage of the article being fired, as well as an undesirable change in surface chemistry.

Plasma arc fired gases differ greatly from ordinary furnace heated gases in that they become ionized and contain electrically charged particles capable of transferring electricity and heat; or, as in the case of nitrogen, become dissociated and highly reactive. For example, nitrogen plasma gas dissociates into a highly reactive mixture of $N_2$-molecules, N-atoms, $N^+$-ions and electrons. This dissociation or ionization greatly increases the reaction rates for sintering ceramic or refractory materials. Nitrogen, for example, which dissociates at around 5000° C. and 1 atmosphere pressure, would not dissociate under the normal furnace sintering conditions of around 1500° C.–2000° C. Thus, the use of plasma gases results in a highly reactive environment, which greatly increases the reaction sintering rate.

However, this highly reactive plasma environment also increases the decomposition of the green body because of the buoyant forces involved in convective heat transfer which increase the flow of the gases in the furnace. These gases sweep away the decomposition products, allowing the decomposition reactions to proceed. In the case of silicon carbide, silicon is continually stripped from the surface of the green body, resulting in a decreased density and undesirable surface chemistry.

SUMMARY OF THE INVENTION

This invention relates to a system for the high temperature sintering of silicon carbide refractory or ceramic articles which prevents, retards or reverses decomposition of the silicon carbide articles.

In a preferred embodiment of the invention, sintering is performed in a furnace with at least one plasma torch positioned near the top of the furnace, and an exhaust outlet positioned near the bottom of the furnace. In large furnaces, it is preferable to position an additional torch (or torches) through the center of the furnace wall opposite the primary plasma torch or torches. This specific positioning of the plasma torch or torches and exhaust outlet serves two functions: (1) it provides maximum turbulence within the furnace for convective heat transfer and uniformity of heating; and (2) it prevents the silicon carbide decomposition reaction products from being swept away from the proximity of the silicon carbide articles being sintered, thus retarding or preventing further decomposition of the silicon carbide articles.

Preferably, the silicon carbide refractory or ceramic articles being sintered are placed into a tube, and most preferably, into a closed tube. When tubes are employed, the silicon carbide decomposition reaction products are contained within the tube, thereby preventing further the decomposition of the silicon carbide articles. Preferably, the tubes are made from graphite but any material common to the art may be used. Obviously, this embodiment attains optimal results when silicon carbide tubes are being sintered.

In another embodiment of the invention, a sacrificial source of silicon carbide is placed into the sintering furnace, preferably near the plasma gas inlet. Because of its higher surface area and a close proximity to the plasma gas inlet, the sacrificial source begins to decompose before the refractory or ceramic article being sintered, thereby saturating the furnace with silicon vapor species. Presence of these gases tends to reverse the silicon carbide decomposition reaction, thus preventing the silicon carbide refractory or ceramic article from decomposing. Very small particles of silicon carbide are preferable for use as the sacrificial source because of their high surface area. Use of a sacrificial source in accordance with the present invention results in a superior sintered product because there is little or no decomposition of the silicon carbide refractory or ceramic article.

Accordingly, it is an object of the present invention to provide an easy, efficient and inexpensive system for the prevention, retardation, or reversal of the decomposition of silicon carbide articles during plasma sintering.

It is a further object of the present invention to provide a system for preventing, retarding or reversing the decomposition of silicon carbide refractory or ceramic articles during sintering which results in high density products with low shrinkage.

Other objects and further scope of applicability of the present invention will become apparent from the detailed description to follow, taken in conjunction with the accompanying drawing.

BRIEF DESCRIPTION OF THE DRAWING

The sole FIGURE of the drawing is an illustration, partially in section, of the heat transfer mechanisms, and positioning of plasma torches, the exhaust outlet and graphite tubes, in a plasma arc furnace in accordance with the present invention.

DESCRIPTION OF THE PREFERRED EMBODIMENT

At the outset, the invention is described in its broadest overall aspects, with a more detailed description following. This invention relates to a system for preventing, retarding, or reversing the decomposition of silicon carbide refractory or ceramic green bodies at high sintering temperatures. The system comprises sintering a silicon carbide refractory or ceramic article in a plasma furnace by either: (1) placing the silicon carbide article in a closed environment, such as a closed tube; (2) placing the silicon carbide article in a closed environment, such as a closed tube, along with a sacrificial source of silicon carbide; (3) placing the silicon carbide article in an open tube; (4) placing the silicon carbide article in an open tube along with a sacrificial source of silicon carbide; (5) placing the silicon carbide article in a completely open sintering environment along with a sacrificial source of silicon carbide; or (6) sintering the silicon carbide article in a furnace designed to maximize buoyant convective heat transfer while minimizing decomposition of the silicon carbide article, with or without graphite tubes or a sacrificial source of silicon carbide. Preferably, sintering is performed in a furnace with at least one plasma torch positioned near the top of the furnace, an exhaust outlet positioned near the bottom of the furnace, and a space between the graphite tubes. The specific positioning of the plasma torch, exhaust outlet, and tubes, and the presence of the sacrificial source all tend to prevent decomposition of the silicon carbide ceramic or refractory article.

When silicon carbide is sintered at temperatures above around 2150° C., it decomposes according to the following reaction:

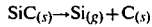

$$SiC_{(s)} \rightarrow Si_{(g)} + C_{(s)}$$

This decomposition causes formation of a carbon layer on the silicon carbide surface, which may then react further with the silicon carbide and silicon gas to form other vapor species, such as $SiC_2$ and $Si_2C$. These reactions result in a net mass loss and decreased density, in addition to a carbon layer on the surface which may give the silicon carbide product undesirable chemical and physical properties. Of course, if the environment around the $SiC_{(s)}$ is saturated with $Si_{(g)}$, the reaction tends to proceed to the left, that is towards $SiC_{(s)}$; thereby retarding or reversing the decomposition reaction.

The present invention prevents, retards or reverses the decomposition of silicon carbide refractory or ceramic green bodies in three ways: (1) by placing the silicon carbide green body in a closed environment, such as a closed graphite tube, a partial pressure of silicon gas builds up within the closed environment. As the environment becomes supersaturated with silicon gas and other silicon vapor species, the decomposition of the silicon carbide green body is halted or retarded; (2) by positioning the plasma arc torch near the top of the furnace and positioning the exhaust outlet near the bottom of the furnace, the buoyant effects of convective heat transfer are minimized. Thus, the silicon vapor species are not swept away, but remain in the graphite tubes or the furnace, itself, keeping the graphite tubes and furnace environment saturated with silicon vapor species; and (3) by employing a sacrificial source of silicon carbon which decomposes before the silicon carbide green body, the furnace atmosphere (open or closed environment) becomes saturated with silicon gas and other silicon vapor species, thereby halting, retarding, preventing or reversing the decomposition of the silicon carbide green body.

The preferred starting material for the silicon carbide refractory or ceramic green bodies should be primarily alpha, noncubic crystalline silicon carbide, since it is more readily available than beta silicon carbide. It is acceptable, however, to use alpha, beta, or amorphous silicon carbide or mixtures thereof. If beta silicon carbide is utilized, it should be of high purity. Boron, carbon or carbonizable organic materials, binders and other additives may be included in the green body mixture depending on product requirements.

The silicon carbide starting mixture may be shaped or formed into shaped green body tubes by any conventional method, such as extrusion, injection molding, transfer molding, casting, cold pressing, isostatic pressing or by compression.

The silicon carbide tubes are then sintered in a plasma arc furnace. The preferred sintering furnace is a tube furnace, such as a graphite resistant tube furnace. The sintering method may be continuous or intermittent depending upon the final physical characteristics desired. The process and means for simultaneously sintering multiple tubes in a plasma fired tube furnace is disclosed in applicants' copending patent application, Ser. No. 815,981, filed Jan. 3, 1986, entitled "Process for Sintering Extruded Powder Shapes", to Jonathan J. Kim et al., and is incorporated herein by reference.

Copending patent applications, Ser. No. 718,376, filed on Apr. 1, 1985 entitled "Plasma Heated Sintering Furnace" to Jonathan J. Kim et al. and Ser. No. 718,375, filed on Apr. 1, 1985 entitled "Plasma Arc Sintering of Silicon Carbide" to Jonathan J. Kim et al., the teachings of which are incorporated herein by reference, are useful in practicing the present invention. U.S. patent application Ser. No. 718,376 discloses a plasma heated furnace and method for sintering refractory or ceramic materials. In a preferred embodiment, the furnace comprises at least two plasma torch inlets, positioned asymmetrically through the walls of the sintering chamber, with one plasma torch inlet positioned near the top of the sintering chamber, the other plasma torch inlet positioned near the center of the furnace, and the exhaust outlet positioned near the bottom of the sintering chamber. U.S. patent application Ser. No. 718,375 discloses a process for the sintering of silicon carbide refractory or ceramic articles in a plasma heated furnace, wherein the silicon carbide article is heated by a plasma gas having an energy capacity of 2000 BTU/lb–6000 BTU/lb to a sintering temperature of between 1500° C.–2500° C., at a heating rate of 300° C./hr.–2000° C./hr., and held at the sintering temperature for 0.1–2 hours. A typical cycle time for the present invention operating in accordance with U.S. patent application Ser. Nos. 718,376 and 718,375 is around eight hours (including cooling), which compares to a total cycle time of around 24 hours for an electric kiln. It should be noted that in prior art electric kilns, such as a CENTORR ™ or ASTRO ™ furnace, the only mode of heat transfer is through radiation.

A plasma sintering furnace is a turbulent flow system, unlike prior art radiant furnaces which are considered stagnant systems. Buoyant convective forces in a turbulent flow system increase the heat transfer rate and provide uniformity of heating.

It is preferable to sinter the silicon carbide green bodies in a closed environment, such as a closed tube, to prevent the decomposition products from being swept away and thereby preventing, retarding or reversing the silicon carbide decomposition reaction. In such an embodiment, as illustrated in the drawing, the silicon carbide green body tubes 10 are preferably placed into a closed environment, such as a closed graphite tube 12. As sintering proceeds, a partial pressure of silicon is built up within the graphite tube. (Thermodynamic calculations have shown that at 2325° C., the partial pressure of silicon in equilibrium with silicon carbide is $3 \times 10^{-3}$ atm.) As the silicon vapors build up, the decomposition of the silicon carbide is halted, retarded or reversed.

A space 14 should be allowed between the graphite tubes 12 to increase the available surface area for heat transfer through convection. The spaces enable flow of the furnace gases and thus better convective heat transfer. The tubes may be stacked in an assembly 16 and held by several holding means 18 as shown in the drawing. The space 14 between the graphite tubes should be at least about 0.5 inches. Although the preferred tube material is graphite, any material common to the art may be utilized.

The location of the plasma torch in the furnace is very important to obtain maximum turbulence, and thereby maximize heat extraction, obtain a high energy efficiency, and minimize temperature gradients in the furnace to obtain uniform sintering and thus consistent products. The plasma torch 20 is preferably positioned near the top of the furnace, as shown in the drawing, to avoid cold pockets. In large furnaces, an additional torch or torches 22 are preferably positioned through the center of the furnace wall opposite the primary torch 20 as is shown in the drawing. Preferably, the exhaust outlet 24 is positioned near the bottom of the furnace to minimize heat losses.

In another embodiment, the system of the present invention for preventing the decomposition of silicon carbide comprises the utilization of a sacrificial source of silicon carbide, which decomposes before the silicon carbide refractory or ceramic article being sintered. The decomposition products from the sacrificial source saturate the furnace environment with silicon gas and other vapor species, which reverse, prevent or retard the silicon carbide refractory or ceramic article from decomposing. Preferably, a closed environment is used, such as a closed tube, in conjunction with a sacrificial source, wherein the sacrificial source is placed inside the tube with the shaped green refractory or ceramic body. An open environment may also be used, wherein the shaped green bodies are placed into open tubes or placed openly into the furnace along with a sacrificial source of silicon carbide.

Normally during sintering of alpha silicon carbide, or other ceramic articles, densification occurs through shrinkage; material from one area of the article is transported to another region of the same article. Usually, material is not exchanged between objects undergoing sintering. The mechanism of densification, important for sintering alpha silicon carbide using the system of the present invention, involves sublimation and condensation. In this mechanism, there is sublimation of the sacrificial source (source) and condensation of the article being sintered (sink). In order to achieve this preferential transport of mass, the chemical potential of the source must be higher than that of the sink.

A higher chemical potential and a transport of mass from the sacrificial source to the silicon carbide green bodies may be achieved in three manners: (1) by holding the source at a higher temperature than the sink, this can be effected by placing the sacrificial source in the furnace near the plasma gas inlet; (2) by making the source from a meta-stable form of material, such as a meta-stable crystal phase or an amorphous structure; or (3) by providing source particles having a very small radius of curvature as compared to the particles of the shaped green bodies.

Preferably, the sacrificial source should have a much higher surface area than the refractory article being sintered so that the sacrificial source decomposes at a faster rate. Small particles of silicon carbide are preferable since they have both a small radius of curvature and a high surface area. The particles should be spread out as thinly as possible to increase the available surface area and to minimize sintering of the sacrificial source which would lower the available surface area and increase the radius of curvature of the individual particles.

Preferably, the sacrificial source or particles are placed near the silicon carbide article to be sintered in a tube, and most preferably in a closed tube. A slurry of silicon carbide source particles may be used to coat the insides of the tube. Alternatively, the article to be sintered may be coated with silicon carbide powder. As another alternative, silicon carbide powder may be placed as a layer in the ends of the tube.

In another embodiment, the shaped silicon carbide green bodies are stacked or placed openly in the furnace. The silicon carbide source particles may be placed openly in the furnace near the silicon carbide articles, or in a large shallow container to maximize the available surface area. In a completely open furnace environment, it is preferable to locate the sacrificial source material near the plasma gas inlet so that it will be at a higher temperature and thus decompose more quickly than the silicon carbide refractory or ceramic articles. Alternatively, a slurry containing the silicon carbide particles may be applied to the furnace walls.

It is preferable to use an oxygen-free gas for sintering silicon carbide articles, so that oxides will not be produced which may have undesirable physical and chemical properties. The preferred gases for sintering of silicon carbide are nitrogen, argon, helium, and/or neon, however, any plasma gas may be used in accordance with the present invention depending upon product requirements.

The system of this invention is useful for sintering standard refractory or ceramic silicon carbide tubes or more complex shapes such as backplates, rotors, scroll assemblies and nozzles. Use of the system of this invention results in a product with a good density and a good dimensional tolerance.

Accordingly, a system has been provided for preventing, retarding or reversing the decomposition of silicon carbide articles during high temperature plasma sintering. The system comprises, in one embodiment, positioning of the plasma torch near the top of the furnace and the exhaust outlet near the bottom of the furnace, leaving a space between graphite tubes and having tubes closed at each end. In another embodiment, the system comprises the use of a sacrificial source of silicon carbide which decomposes before the silicon carbide refractory or ceramic article.

Although the invention has been described with reference to its preferred embodiment, other embodiments can achieve the same results. Variations and modifications of the present invention will be obvious to those skilled in the art and it is intended to cover in the appended claims all such modificiations and equivalents.

We claim:

1. A method for preventing, halting, retarding or reversing the decomposition of silicon carbide articles during high temperature sintering in a plasma furnace comprising:
   placing formed silicon carbide articles into at least one tube within a plasma furnace; and
   sintering the silicon carbide articles in the plasma furnace whereby a partial pressure of silicon gas builds up within the environment rendered by the tube thereby saturating the environment with silicon gas and other silicon vapor species, halting further decomposition of the silicon carbide articles.

2. A method in accordance with claim 1 wherein said tube is a graphite tube.

3. A method in accordance with claim 1 wherein said tube is closed at each end.

4. A method in accordance with claim 1 wherein said silicon carbide articles include silicon carbide tubes.

5. A method in accordance with claim 1 comprising at least two tubes stacked in an assembly, wherein a space of at least 0.5 inches is provided between said tubes.

6. A method in accordance with claim 1 further comprising introducing a plasma heated gas into said furnace from at least one primary plasma torch positioned near the top of said furnace.

7. A method in accordance with claim 6 further comprising introducing a plasma heated gas from at least one additional plasma torch positioned through the center wall of said furnace and opposite said primary plasma torch.

8. A method in accordance with claim 6 further comprising expending the plasma gas exhaust through an exhaust outlet positioned near the bottom of said furnace.

9. A method in accordance with claim 1 further comprising placing a sacrificial source of silicon carbide in said furnace, said sacrificial source of silicon carbide beginning decomposition before the silicon carbide articles being sintered.

10. A method in accordance with claim 9 wherein said sacrificial source of silicon carbide has a higher surface area than the particles of the silicon carbide articles being sintered.

11. A method in accordance with claim 9 wherein said sacrificial source of silicon carbide has a smaller radius of curvature than the particles of the silicon carbide articles being sintered.

12. A method in accordance with claim 9 wherein said sacrificial source of silicon carbide is in the form of a meta-stable material.

13. A method in accordance with claim 9 wherein said sacrificial source of silicon carbide is placed into said tube.

14. A method in accordance with claim 13 wherein said sacrificial source of silicon carbide comprises a coating on the inside of said tube.

15. A method in accordance with claim 13 wherein said sacrificial source of silicon carbide comprises a powder on the ends of said tube.

16. A method in accordance with claim 9 wherein said sacrificial source of silicon carbide is placed into a shallow container.

17. A method in accordance with claim 9 wherein said sacrificial source of silicon carbide is placed near at least one plasma torch inlet.

* * * * *